(12) United States Patent
Marinier

(10) Patent No.: US 7,158,807 B2
(45) Date of Patent: Jan. 2, 2007

(54) EQUALIZING SIGNAL-TO-INTERFERENCE RATIOS OF DIFFERENT PHYSICAL CHANNELS SUPPORTING A CODED COMPOSITE TRANSPORT CHANNEL

(75) Inventor: Paul Marinier, Brossard (CA)

(73) Assignee: InterDigital Technology Corporation, Wilmington, DE (US)

(*) Notice: Subject to any disclaimer, the term of this patent is extended or adjusted under 35 U.S.C. 154(b) by 611 days.

(21) Appl. No.: 10/629,420

(22) Filed: Jul. 29, 2003

(65) Prior Publication Data

US 2004/0022189 A1    Feb. 5, 2004

Related U.S. Application Data

(60) Provisional application No. 60/399,811, filed on Jul. 31, 2002.

(51) Int. Cl.
*H04Q 7/00* (2006.01)

(52) U.S. Cl. .................. 455/522; 455/69; 455/127.1

(58) Field of Classification Search ............... 455/522, 455/69, 135, 136, 140, 127.1, 127.2, 226.3, 455/561; 375/140; 370/342
See application file for complete search history.

(56) References Cited

U.S. PATENT DOCUMENTS

| | | | |
|---|---|---|---|
| 6,141,393 A | 10/2000 | Thomas et al. | 375/347 |
| 6,148,216 A * | 11/2000 | Osaki | 455/561 |
| 6,556,839 B1 | 4/2003 | Kondo | 455/522 |
| 6,574,293 B1 | 6/2003 | Khayrallah et al. | 375/342 |
| 2002/0055367 A1* | 5/2002 | Hamabe et al. | 455/522 |
| 2002/0196766 A1* | 12/2002 | Hwang et al. | 370/342 |

* cited by examiner

Primary Examiner—Edward F. Urban
Assistant Examiner—Blane J. Jackson
(74) Attorney, Agent, or Firm—Volpe and Koenig, P.C.

(57) ABSTRACT

A system and method for equalizing the signal-to-interference ratios (SIRs) of a plurality of physical channels supporting a coded composite transport channel CCTrCH comprises calculating new transmission powers such that not only are the SIRs of the physical channels equalized, but also the average SIR of the CCTrCH remains constant.

10 Claims, 6 Drawing Sheets

EQUALIZING SIGNAL-TO-INTERFERENCE RATIOS OF DIFFERENT PHYSICAL CHANNELS SUPPORTING A CODED COMPOSITE TRANSPORT CHANNEL

CROSS REFERENCE TO RELATED APPLICATION(S)

This application claims priority from U.S. provisional application No. 60/399,811 filed on Jul. 31, 2002, which is incorporated by reference as if fully set forth.

FIELD OF THE INVENTION

The present invention relates to wireless, time slotted communication systems. More specifically, the present invention is directed to a method of equalizing the signal-to-interference ratios of different physical channels supporting a coded composite transport channel without modifying the average signal to interference ratios of a coded composite transport channel.

BACKGROUND

There are many types of shared wireless communications networks, such as those used in Third Generation (3G) cellular telephony communications. One of the techniques used in wireless communications equipment using a shared network includes the allocation of transmit power for communications in different channels. By effectively controlling the transmit power, it is possible to reduce overall power consumption, increase utilization of bandwidth and maintain at the appropriate value the signal-to-interference ratios (SIRs) of the different physical channels supporting a coded composite transport channel (CCTrCH).

In certain current wireless systems, the different types of data a user needs to transmit or receive may be coded and multiplexed in one or more CCTrCHs. The multiplexing is performed in a way that the quality of service (QoS) for those different types of data, in terms of the probability of receiving a transport block in error, will be met for the same value of the SIR of the received symbols of the CCTrCH. This allows an optimal use of the radio resources. These systems are able to transmit a wide range of services, from high data rate services such as video and Internet downloads, to low data rate services such as voice.

Referring to FIG. 1, a plurality and variety of user services are graphically shown as individual data streams. These individual data streams are assigned to transport channels A, B and C, whereby the data streams are coded and multiplexed. Each transport channel A, B, C is assigned a specific coding rate and a specific transmission time interval (TTI). The coding rate for each transport channel determines the number of transmitted bits of the physical layer, and the TTI defines the delivery period of the block of data to be transmitted. For example, the TTI may be 10, 20, 40 or 80 ms. Coded bits from the various transport channels are multiplexed and interleaved to form a CCTrCH. The bits of a CCTrCH are then paired to form symbols, which are transmitted (after spreading) through one or a plurality of physical channels defined in terms of time slot and spreading code.

The transmission on physical channels occurs after the transport channels have been multiplexed onto the CCTrCH. The number of symbols ($N_s$) carried by a physical channel is inversely proportional to the spreading factor of the code of the physical channel. In other words, $N_s = N_c/G$, where $N_c$ is the number of chips spreading the symbols in a time slot, and G is the spreading factor. The number of chips $N_c$ is normally the same for all physical channels supporting a CCTrCH.

Referring to FIG. 2, at the transmitter side each physical channel is transmitted at a certain power level $P_i$, where the index i is over the physical channels. At the receiver side, the signal from a physical channel has a power level $R_i = P_i/L$ where L is the path loss. After despreading, the power of the received symbols is $G_i * P_i/L$, where $G_i$ is the spreading factor of the physical channel. Therefore, if the interference level is $I_i$ in the slot occupied by the physical channel, the SIR in this physical channel, at the symbol level, is given by Equation (1):

$$SIR_i = \frac{G_i P_i}{LI_i} \qquad \text{Equation (1)}$$

The quality of reception of a CCTrCH, in terms of the probability of receiving a transport block in error, is a function of the SIRs of the received symbols. When the SIRs of the received symbols all have the same value, this value is a direct indicator of the quality of the connection. In general, however, the SIRs of received symbols may have different values. An approximate indicator of the quality of the connection may be obtained by averaging the values of the SIRs of the received symbols. In essence, the quality of the connection with unequal SIRs of symbols, whose average value is $\overline{SIR}$, should be approximately the same as the quality of a connection with the SIRs of symbols all equal to $\overline{SIR}$.

The averaging can be done linearly or logarithmically (i.e., averaging the SIR values in dB). The logarithmic average is always lower than the linear average, and as such, can be considered a more conservative indicator of the quality of the connection. The computations can be used to provide linear or logarithmic averages, as a function of the different power levels of the physical channels of the CCTrCH.

To perform a linear average, the average SIR of the CCTrCH ($\overline{SIR}_{lin}$) is computed as follows:

$$\overline{SIR}_{lin} = \frac{\sum_{i=1}^{N} (\text{Number of symbols in physical channel i}) \times SIR_i}{\text{Total number of symbols in all physical channels}} \qquad \text{Equation (2)}$$

The SIR of each physical channel is multiplexed by the number of symbols it is carrying to compute the average over all symbols of the CCTrCH. Since the number of symbols in physical channel i is equal to $N_c/G_i$, and substituting Equation (1) for $SIR_i$, this becomes:

$$\overline{SIR}_{lin} = \frac{\sum_{i=1}^{N} (N_c/G_i) \times (G_i P_i / L I_i)}{\sum_{i=1}^{N} (N_c/G_i)}$$

Equation (3)

$$= \frac{\sum_{i=1}^{N} \frac{P_i}{I_i}}{L \sum_{i=1}^{N} \frac{1}{G_i}}$$

Equation (3) expresses the linear average SIR ($\overline{SIR}_{lin}$) of the CCTrCH as a function of the transmission power levels ($P_i$), interference levels ($I_i$) and spreading factors ($G_i$) of all physical channels, as well as the path loss (L).

The logarithmic average SIR ($\overline{SIR}_{log}$) of the CCTrCH is defined, following similar principles, as follows:

$$\log_{10}(\overline{SIR}_{log}) = \frac{\sum_{i=1}^{N} (\text{Number of symbols in physical channel i}) \times \log_{10}(SIR_i)}{\text{Total number of symbols in all physical channels}}$$

Equation (4)

$$= \frac{\sum_{i=1}^{N} (N_c/G_i) \times \log_{10}(G_i P_i / L I_i)}{\sum_{i=1}^{N} (N_c/G_i)}$$

$$= \frac{\sum_{i=1}^{N} (1/G_i) \times \log_{10}(G_i P_i / L I_i)}{\sum_{i=1}^{N} (1/G_i)}$$

Equation (4) expresses the logarithmic average SIR of the CCTrCH as a function of the transmission power levels ($P_i$), interference levels ($I_i$) and spreading factors ($G_i$) of all physical channels, as well as the path loss (L).

In most current wireless systems the downlink power control is closed-loop. This means that the base station must adjust the transmit power every frame based on up/down transmit power control (TPC) commands sent by the mobile unit during an uplink transmission, (for example, uplink CCTrCH). The mobile unit determines the TPC command by comparing the experienced SIR to a certain SIR target. While the downlink CCTrCH of a mobile unit may have physical channels occupying more than one slot, multiple TPC commands per frame would be possible only in case of multiple uplink CCTrCHs. In many cases however, there is only a single uplink CCTrCH for a mobile unit. In this situation, there is only one TPC command per frame that the mobile unit can send to command the power transmitted by the base station on more than one slot.

Since the interference signal code power (ISCP) on each downlink slot is subject to variations over time, the downlink CCTrCH may be adversely affected. For example, assuming physical channels on 2 slots, over a certain period of time the ISCP on the first slot may increase by 5 dB while the ISCP on the second slot may decrease by 3 dB. Using a single TPC command to control the transmission power on those two slots, it is impossible for the mobile unit to inform the base station to increase the power on one slot but decrease the power on the other slot. As a result, the SIRs of the downlink physical channels occupying different slots are very likely to drift apart if the base station strictly follows the TPC commands sent by the mobile unit, because the base station has to apply the same TPC command to all physical channels regardless of the slots they are occupying.

It is desirable for an optimal use of the radio resources that the SIRs of the different physical channels be as equal as possible at the symbol level. To achieve this, and because interference conditions in the different time slots change over time, the system needs to readjust, from time to time, the transmission powers allocated in each timeslot to the different physical channels so that the SIRs of the physical channels which are in different slots become as equal as possible. This process is known as SIR equalization and is achieved through the process shown in FIG. 3.

FIG. 3 shows the process implemented by a Controlling Radio Network Controller (CRNC), a base station and a mobile unit to perform SIR equalization. This process enables the base station to use the downlink timeslot ISCP values when deciding the downlink TX power for each timeslot. The mobile unit periodically measures downlink (DL) ISCP and transmits ISCP measurements to the CRNC for each timeslot in which it is receiving a signal. The CRNC sends a DL POWER TIMESLOT CONTROL REQUEST message to the base station, along with DL ISCP values, which are the interference levels in every slot occupied by the physical channels for the concerned CCTrCH. Upon reception, the base station uses the indicated DL timeslot ISCP values sent by the CRNC to set the downlink TX power for each timeslot. The base station reduces the downlink TX power in those downlink timeslots of the radio link where the interference is low; and increases the downlink TX power in those timeslots where the interference is high, while keeping the total downlink power in the radio link unchanged.

The procedure 30 followed by the base station for performing SIR equalization is detailed in FIG. 4. The procedure 30 starts with the reception of the DOWNLINK POWER TIMESLOT CONTROL REQUEST message from the CRNC containing the ISCP values (step 32). The base station associates interference levels $I_i$ to the different physical channels, where the index i is over the physical channels, depending on the time slot occupied by each of the physical channels (step 34). The interference level I is the same for all physical channels that occupy the same time slot, (i.e., $I_i=I_j$ if physical channels i and j are in the same time slot.) Since the base station is responsible for the transmission of the signal to the mobile unit, it always knows the latest transmitted power level $P_i$ as well as the spreading factor $G_i$ of every physical channel.

The base station then takes these set of values ($I_1$, $I_2$, ..., $I_N$, $P_1$, $P_2$, ..., $P_N$, $G_1$, $G_2$, ..., $G_N$), where N is the number of physical channels supporting the CCTrCH, and computes a new set of values ($P_1'$, $P_2'$, ..., $P_N'$) for the transmission power levels of the physical channels (step 36). The goal of equalization is to make the SIR of all physical channels equal. Accordingly;

$$SIR_i' = \frac{G_i P_i'}{LI_i} = K \qquad \text{Equation (5)}$$

In Equation (5), $SIR_i'$ denotes the SIR of physical channel i just after equalization, and K is the value of the SIR after equalization, which must be the same for all physical channels. In one prior art system, this value K is computed according to the following:

$$K = \frac{\sum_{i=1}^{N} P_i}{L \sum_{i=1}^{N} \frac{I_i}{G_i}} \qquad \text{Equation (6)}$$

Substituting Equation (6) in Equation (5), the new set of transmission power values ($P_1'$, $P_2'$, ..., $P_N'$) is therefore computed by applying the following equation:

$$P_i' = \left( \frac{\sum_{i=1}^{N} P_i}{\sum_{i=1}^{N} \frac{I_i}{G_i}} \right) \frac{I_i}{G_i} \qquad \text{Equation (7)}$$

Immediately after application of Equation (7), the SIRs of the physical channels are all equal. In addition, it can be verified that the sum of the transmission powers is the same before and after SIR equalization $$\left( \sum_{i=1}^{N} P_i' = \sum_{i=1}^{N} P_i \right).$$

These new power values ($P_1'$, $P_2'$, ..., $P_N'$) are then applied to the physical channels (step 38).

While the process shown in FIG. 4 and set forth in Equation 7 equalizes the SIRs of the different physical channels, it suffers from a major drawback. Although, the total power over all physical channels before and after SIR equalization is the same, the SIR of the physical channels after application of the new set of transmission powers $P_i'$ could be significantly different from the average SIR over all physical channels before equalization, as defined according to either Equation (3) (linear average) or Equation (4) (logarithmic average). As a result, the quality of the reception may suffer a sudden and severe degradation until power control eventually restores the average SIR to its original level.

Therefore, there are instances in which the existing equalization process does not maintain the average SIR constant. By the way of example, the CCTrCH may be supported by two physical channels of equal spreading factors, (such as $G_1 = G_2 = 16$). The transmission power levels of the physical channels before equalization are $P_1 = P_2 = 1$ mW. The corresponding interference levels are: $I_1 = 1 \times 10^{-9}$ mW and $I^2 = 8 \times 10^{-9}$ mW. The path loss is $L = 1 \times 10^9$. Prior to SIR equalization, the SIRs of physical channels are therefore: $SIR_1 = 16$ and $SIR_2 = 2$. The average SIR (linear) is $\overline{SIR}_{lin} = 9$ according to Equation (3). The average SIR (logarithmic) is $\overline{SIR}_{log} = 5.7$. After SIR equalization, Equation (7) shows that the new transmission power levels are: $P_1' = 0.22$ mW and $P_2' = 1.78$ mW, and the SIRs of both physical channels (as well as the average SIR, linear or logarithmic) is equal to $\overline{SIR}hd\ lin = \overline{SIR}_{log} = SIR_1 = SIR_2 = 3.56$. Clearly, this is lower than both the linear or logarithmic average SIR before the SIR equalization procedure. If the average SIR, either linear or logarithmic, was at a level such that the QoS was just met for this CCTrCH, this reduction would result in a degradation of quality until power control restores the average SIR to its original level. This behavior is undesirable.

SUMMARY OF THE INVENTION

According to the present invention, SIRs of physical channels are equalized in a CCTrCH. New transmission power levels are calculated for multiple physical channels such that not only SIRs of physical channels are equalized, but also the average SIR of the CCTrCH remains constant. According to the present invention, the total transmission power of the CCTrCH does not necessarily remain constant, as in prior art arrangements.

In one embodiment of the invention, the linearly averaged SIR remains constant after SIR equalization. In another embodiment, the logarithmically averaged SIR remains constant.

DETAILED DESCRIPTION OF THE PREFERRED EMBODIMENT(S)

Figure 1:
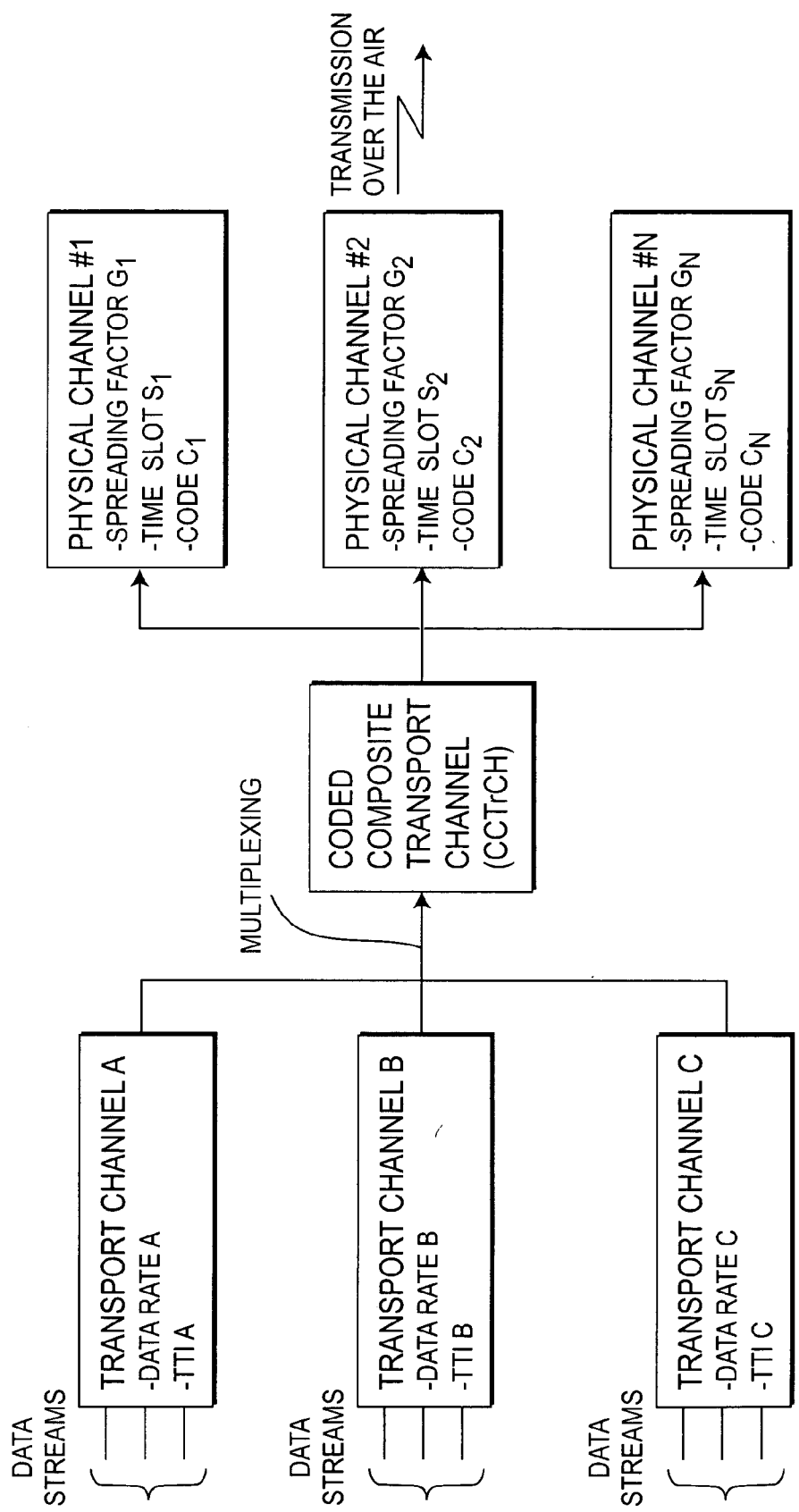
FIG. 1 is a block diagram of prior art individual data streams being combined into a CCTrCH transmitted over a plurality of physical channels.
Figure 2:
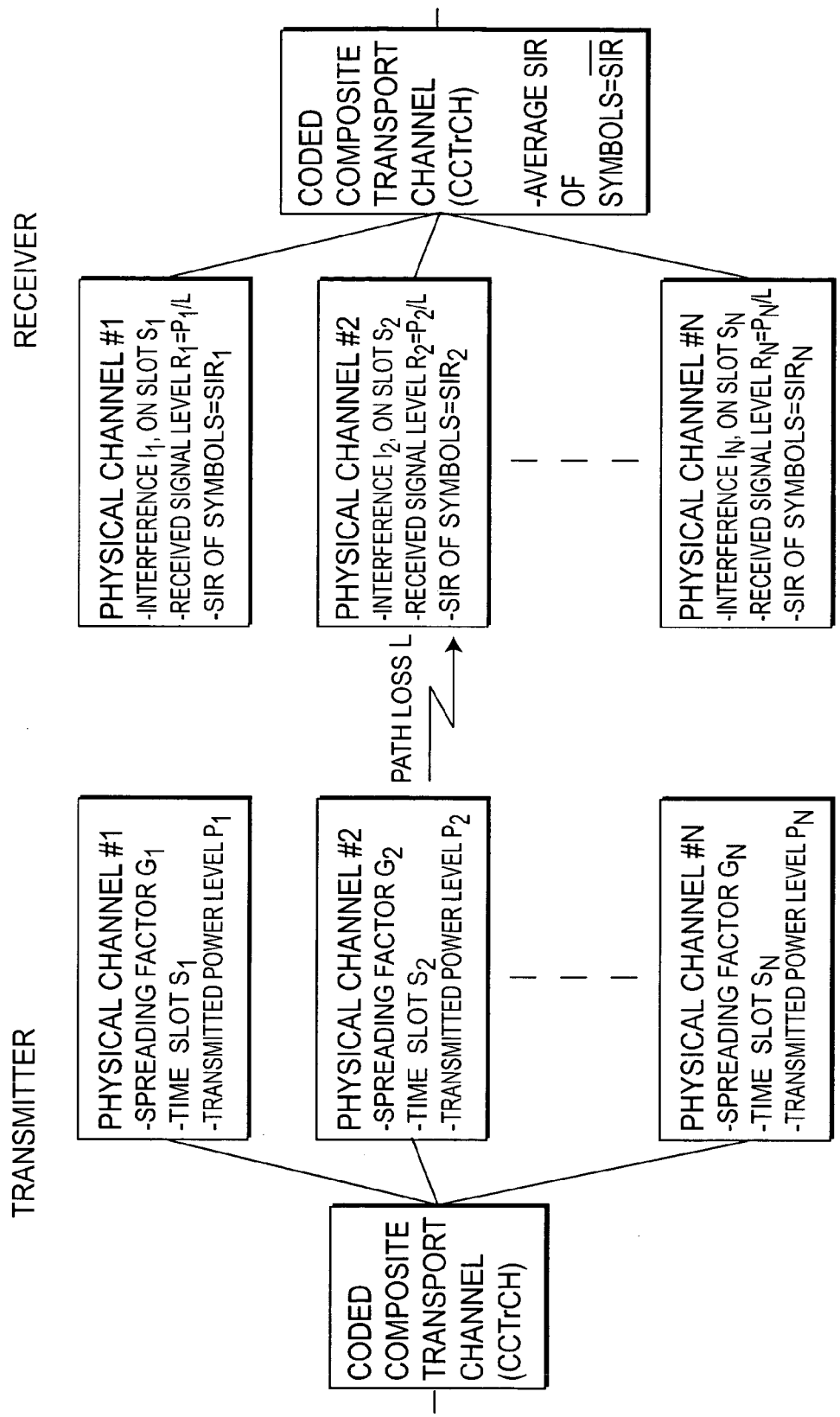
FIG. 2 is a diagram of prior art physical channels being transmitted over the air interface.
Figure 3:
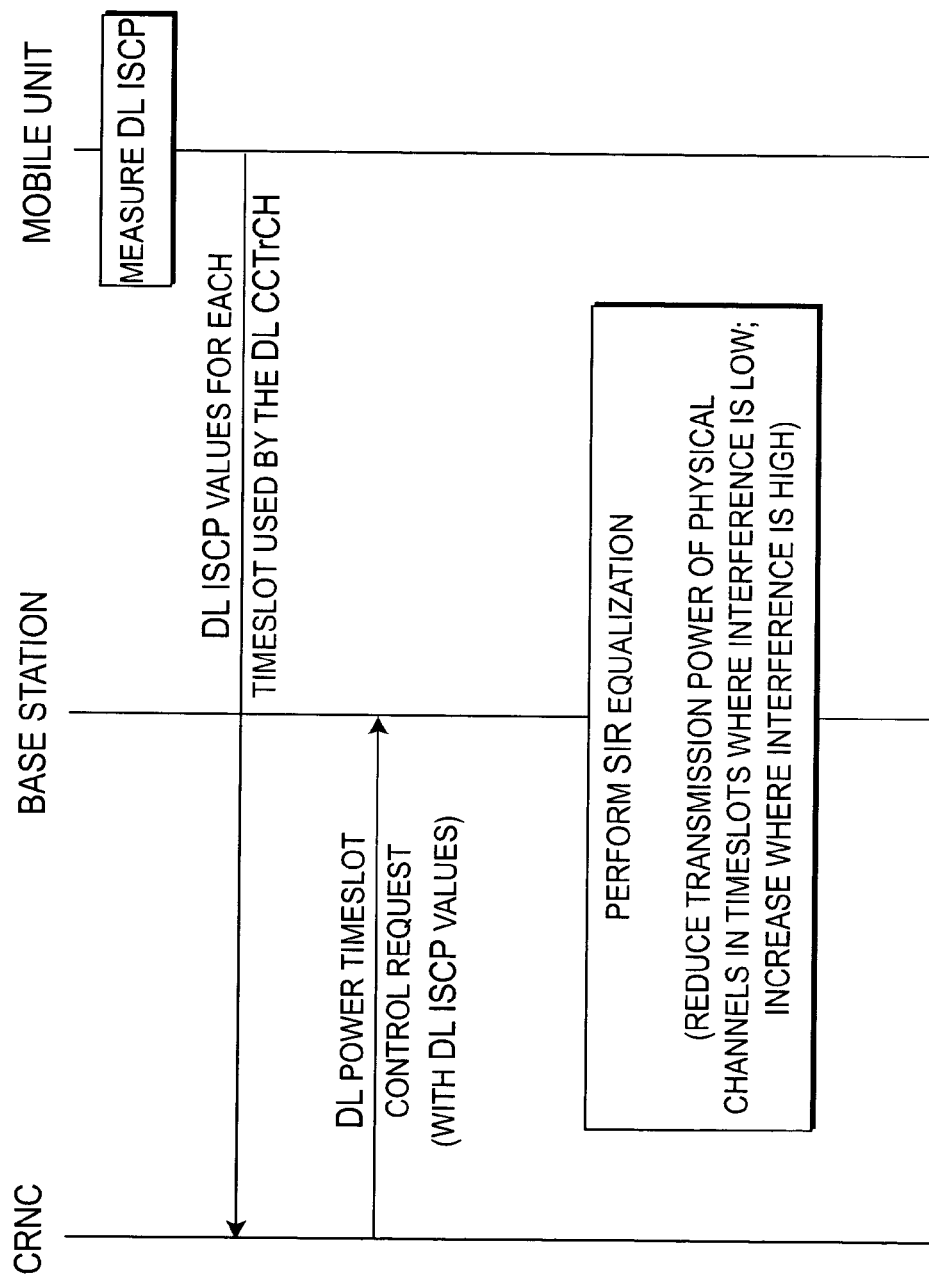
FIG. 3 is a flow diagram of a prior art signaling procedure between the CRNC, the base station and a mobile unit for SIR equalization.
Figure 4:
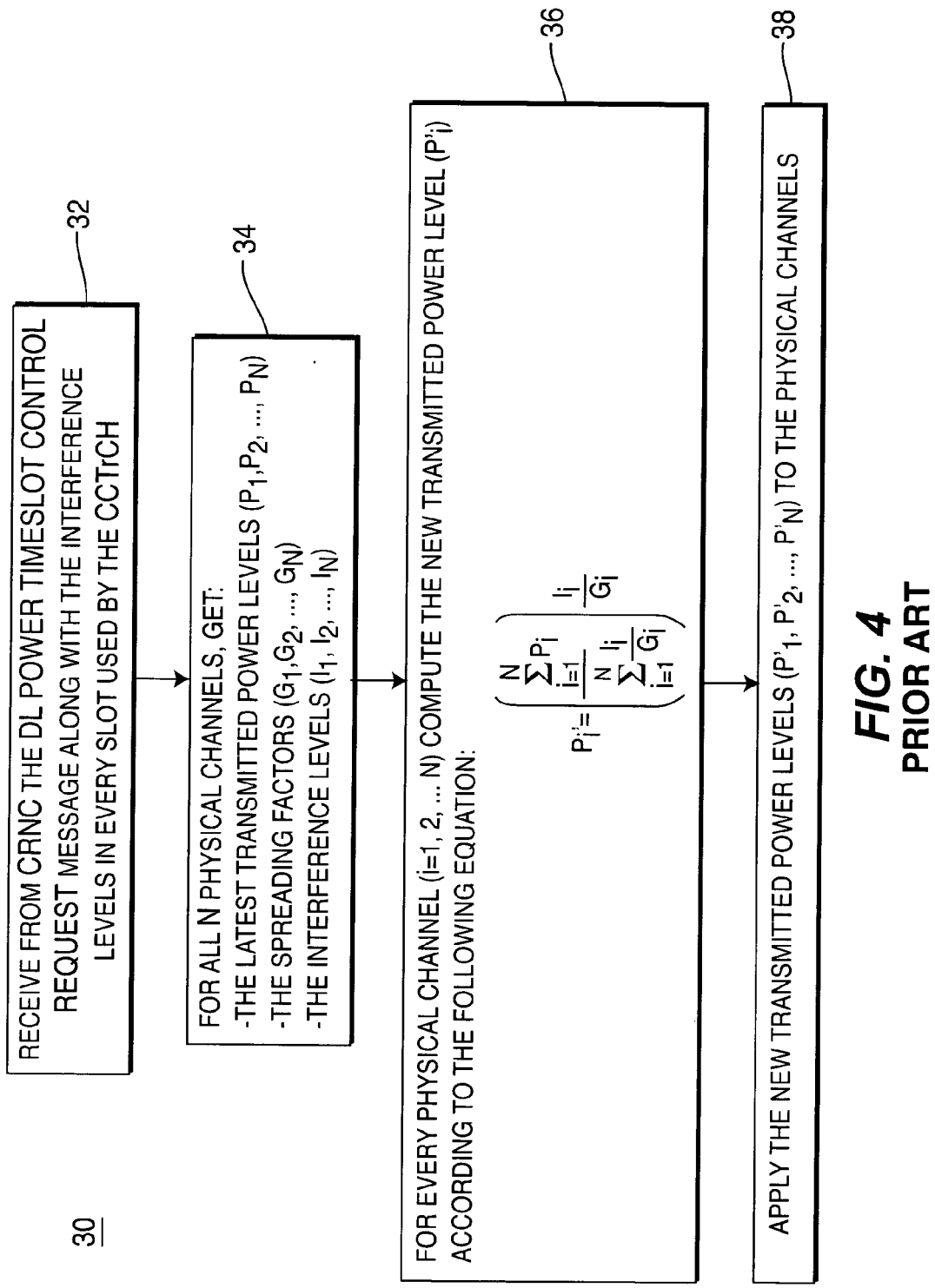
FIG. 4 is a flow diagram of a prior art SIR equalization procedure, as performed at the base station.

The present invention will be described with reference to the drawing figures where like numerals represent like elements throughout.

Figure 5:
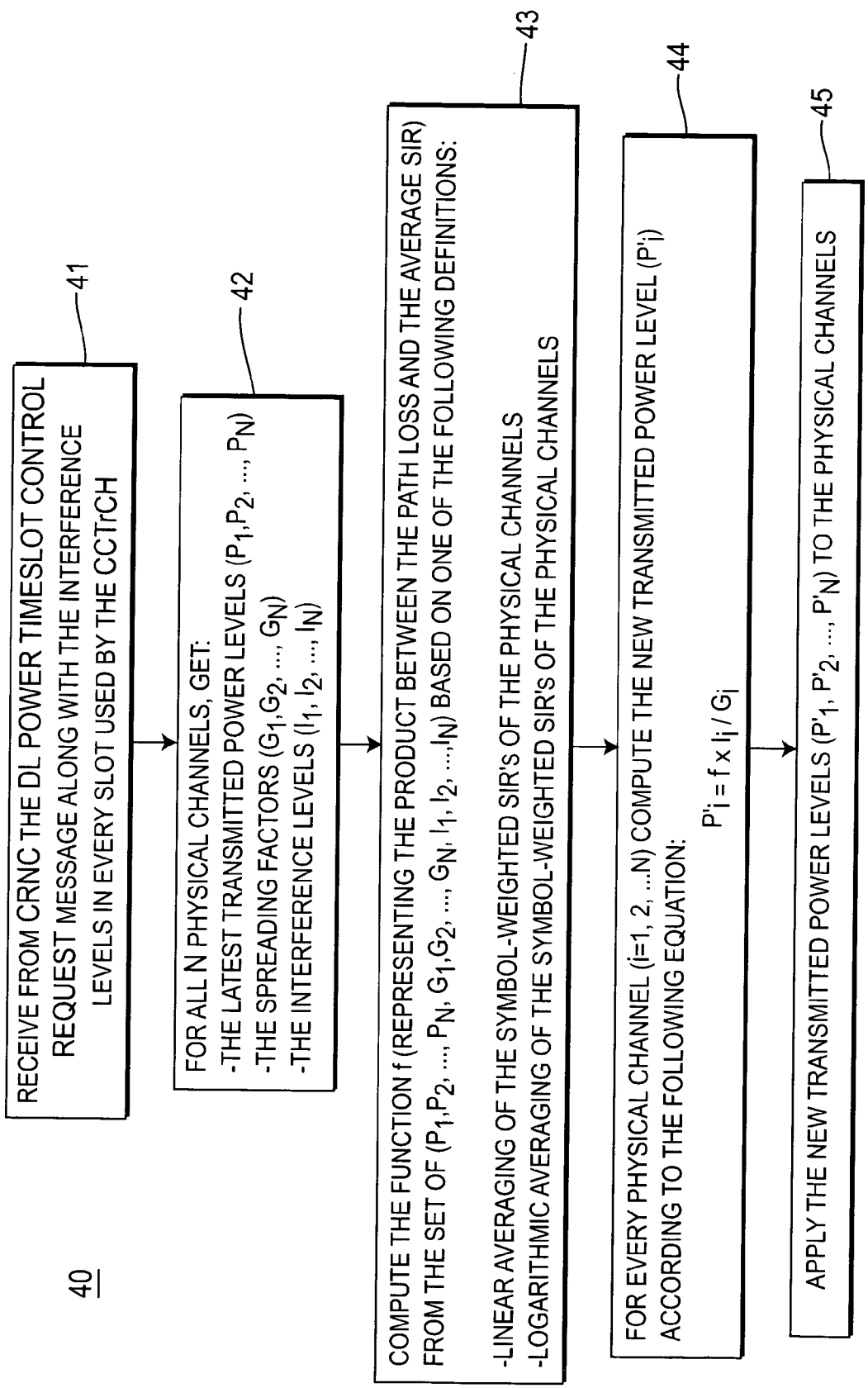
FIG. 5 is a flow diagram of the SIR equalization procedure in accordance with the present invention.

Referring to a procedure 40 in accordance with the present invention shown in FIG. 5, the base station receives the DL POWER TIMESLOT CONTROL REQUEST message from the CRNC, along with the interference levels in all time slots used by the physical channels supporting the CCTrCH subject to SIR equalization (step 41). The base station thus knows the interference levels ($I_1, I_2, \ldots, I_N$) associated to every physical channel supporting the CCTrCH, (where N is the number of physical channels). Additionally, the base station knows the latest transmission power levels ($P_1, P_2, \ldots, P_N$) of every physical channel along with their spreading factors ($G_1, G_2, \ldots, G_N$) (step 42). As understood by those of skill in the art, the entity that manages the transmission power levels, (i.e., the power control manager 70 shown in FIG. 6) is located in the base station. The spreading factors are also known by the base station, as it received this information from the CRNC upon setting up the connection.

The base station, using the interference levels ($I_1, I_2, \ldots, I_N$), the latest transmission powers ($P_1, P_2, \ldots, P_N$) and spreading factors ($G_1, G_2, \ldots, G_N$) of every physical channel, implements a function (f) representing the product between the average SIR and the path loss (step 43). The function (f) may be based on either linear averaging or logarithmic averaging of the symbol-weighted SIRs of the physical channels.

In the case where the linear definition of average SIR is used as in Equation (3), the function (f) is computed as follows:

$$f = L\overline{SIR}_{lin} = \frac{\sum_{i=1}^{N} \frac{P_i}{I_i}}{\sum_{i=1}^{N} \frac{1}{G_i}} \qquad \text{Equation (8)}$$

Essentially, for each physical channel, the ratio between the transmission power $P_i$ of a physical channel and its interference level $I_i$ is computed. Then the ratios for all physical channels are summed and this sum is divided by the sum of the inverse of spreading factors of all physical channels.

In the case where the logarithmic definition of average SIR is used as in Equation (4), the function (f) is expressed as follows:

$$f = L\overline{SIR}_{log} = L\exp_{10}\left(\frac{\sum_{i=1}^{N}(1/G_i)\times\log_{10}(G_i P_i / LI_i)}{\sum_{i=1}^{N}(1/G_i)}\right) \qquad \text{Equation (9)}$$

$$= \left[\prod_{i=1}^{N}\left(\frac{G_i P_i}{I_i}\right)^{\frac{1}{G_i}}\right]^{1/\sum_{i=1}^{N}\frac{1}{G_i}}$$

Note that in the special case where the spreading factors are all equal ($G_1 = G_2 = \ldots = G_N = G$), as in the Time Division Duplex (TDD) (3.84 Mcps) mode of UTRA, Equation (9) simplifies to:

$$f = G\left(\prod_{i=1}^{N}\frac{P_i}{I_i}\right)^{1/N} \qquad \text{Equation (10)}$$

where G is the spreading factors of all physical channels.

Essentially, for each physical channel, the ratio between the transmission power $P_i$ of a physical channel and its interference level $I_i$ is computed. Then the Nth root (e.g. square root if N=2, cubic root if N=3, etc.), where N is the number of physical channels, of the product of the ratios for all physical channels is computed, and the result is multiplied by the spreading factor G. Alternatively, the Nth root of each ratio could be computed and then multiplied together. One skilled in the art should realize that any type of function that obtains the same results is included within the scope of the present invention.

After having computed the function (f), the base station computes the new transmission power levels ($P'_1, P'_2, \ldots, P'_N$) to assign to the physical channels (step 44), using the following:

$$P'_i = \frac{I_i}{G_i} f \qquad \text{Equation (11)}$$

Finally, the base station assigns the new transmission power levels ($P'_1, P'_2, \ldots, P'_N$) to the physical channels of the CCTrCH, (step 45).

As described hereinbefore, the present invention achieves the following two goals: 1) the symbol-level SIRs of all of the physical channel are equal to each other; and 2) the average SIR of the CCTrCH (linear or logarithmic) is the same as before SIR equalization.

It should be apparent that Equation (11) satisfies the two conditions since the symbol-level SIR of every physical channel after equalization are then all equal to:

$$SIR'_i = G_i \frac{P'_i}{I_i} \frac{1}{L} = \frac{f}{L} = \overline{SIR} \qquad \text{Equation (12)}$$

As those of skill in the art should realize, other definitions of the average SIR of a CCTrCH may be possible, aside from the two explicitly defined this description, (linear and logarithmic).

An alternative method for equalizing the SIRs of the physical channels, while maintaining the average SIR constant according to another definition, is the same as hereinbefore described, except that the function (f) is modified to correspond to the product between the path loss and the chosen definition of average SIR.

Applying the new transmission powers using the method in accordance with the present invention will not change the average SIR of the CCTrCH, which is beneficial to the quality of service for this CCTrCH. Additionally, the mobile unit does not need to do anything special when SIR equalization occurs; rather the mobile unit will experience equal SIR across all physical channels after SIR equalization takes place.

Figure 6:
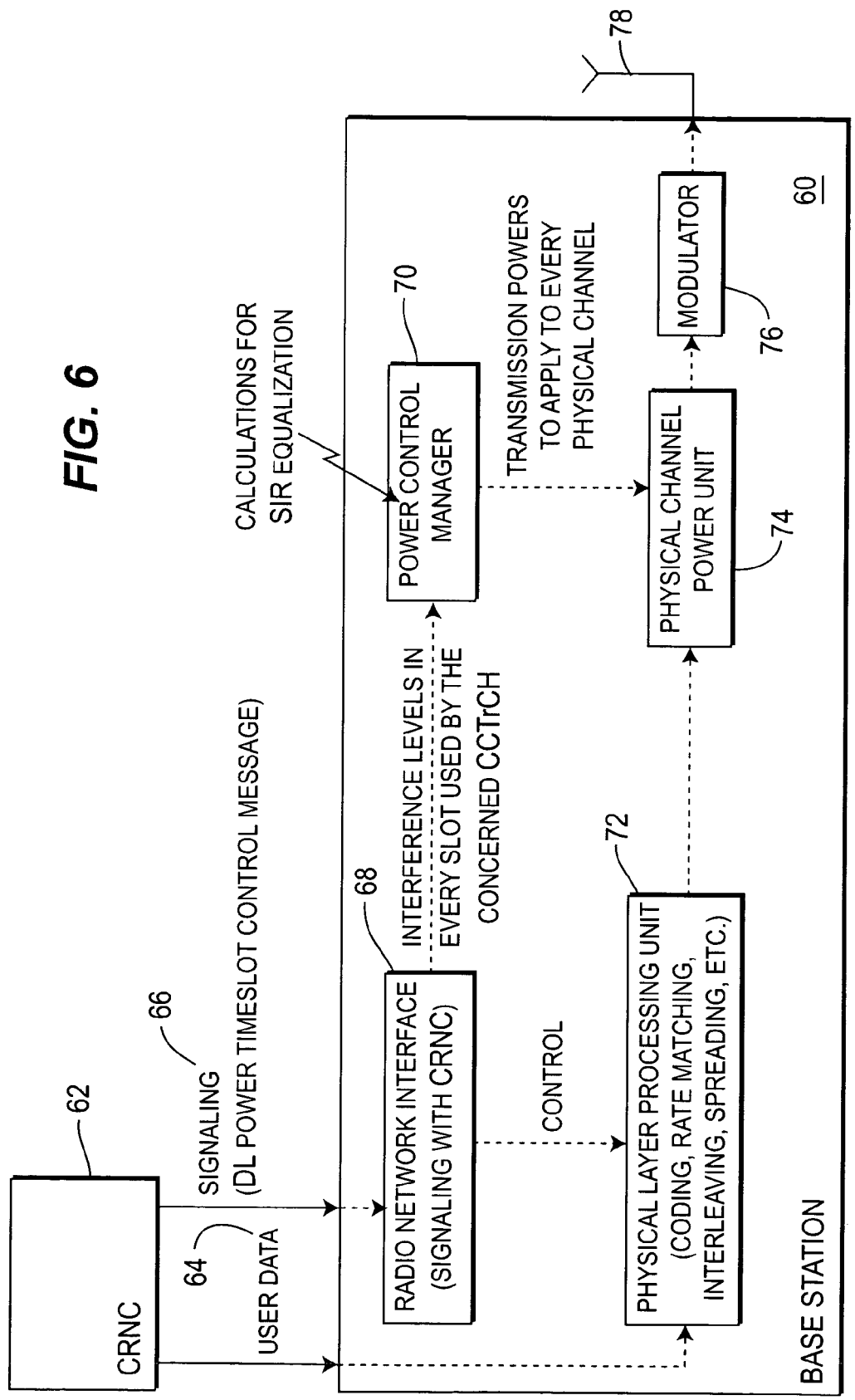
FIG. 6 is a block diagram of a base station made in accordance with the present invention.

FIG. 6 is a base station 60 made in accordance with the present invention. The base station 60 receives from the CRNC 62 user data 64 (coming from the core network) and signaling messages 66, such as the DL POWER TIMESLOT CONTROL REQUEST message used for the SIR equalization process. The radio network interface 68 is responsible for decoding and interpreting the signaling messages from the CRNC 62. It thus controls the various parameters implemented in the physical layer processing unit 72 undertaken on the user data 64.

The power control manager 70 is responsible for providing the appropriate transmission power levels to the physical channels power unit 74 where the signals from each physical channel are weighted according to their respective power levels, before modulation in the modulator 76 and transmission of these physical channels via the antenna 78.

When SIR equalization takes place, the DL POWER TIMESLOT CONTROL REQUEST message is received by the radio network interface 68, which then forwards to the power control manager 70 the interference levels in very slot used by the concerned CCTrCH. The power control manager 70 then computes the new transmission power levels to apply to the physical channels of the concerned CCTrCH, as hereinbefore described with respect to the present invention. The physical layer processing unit 72 processes the user data 64, and forwards the physical channel to the physical channel power unit 74. The power levels are used by the physical channel power unit 74 to appropriately set the power of each physical channel. The channels are then modulated in the modulator 76 and transmitted via the antenna 78.

The present invention was described in conjunction with the application of the invention for use with voice as well as data according to a 3G system. However, the 3G system was used only as an example, and the invention can be applied to other wireless communication systems where data can be transmitted over multiple channels which may or may not be power-controlled by the same TPC commands and where the interference can be different.

While the present invention has been described in terms of the preferred embodiment, other variations which are within the scope of the invention as outlined in the claims below will be apparent to those skilled in the art.

What is claimed is:

1. A method of equalizing the signal to interference ratios (SIRs) of a plurality of physical channels, each physical channel having a first transmission power level, the method comprising:
    determining the SIR for each of said plurality of physical channels;
    determining a first average SIR based upon the SIRs for said plurality of physical channels; and
    calculating a new transmission power level for each of said plurality of physical channels; whereby said calculation of said new transmission power levels comprises:
        ensuring the new SIRs of said plurality of physical channels are equal to each other; and
        ensuring the new average SIR for said plurality of physical channels is substantially the same as said first average SIR.

2. The method of claim 1, wherein said first average is a linear weighted average.

3. The method of claim 1, wherein said first average is a logarithmically weighted average.

4. A method of equalizing the signal to interference ratios (SIRs) of a plurality (i) of physical channels, each physical channel having a first power level $P_i$, the method comprising:
    determining a first average SIR for said plurality (i) of physical channels;
    for each of said plurality (i) of physical channels:
        determining the current transmission power level $P_i$;
        determining the current interference level $I_i$; and
        determining the spreading factor $G_i$; and
    for each of said plurality (i) of physical channels:
        calculating a new transmission power level $P_i'$; whereby the new transmission power levels satisfy two conditions: 1) the new SIRs of said plurality of physical channels are equal to each other; and 2) the new average SIR for said plurality of physical channels is substantially the same as said first average SIR.

5. The method of claim 4, further including applying said new transmission power levels $P_i$ to said plurality (i) of physical channels.

6. The method of claim 4, wherein said calculation step further includes determining the ratio between the transmission power $P_i$ of a physical channel and its interference level $I_i$.

7. The method of claim 6 wherein said calculation step further includes summing said ratios for all of said plurality (i) physical channels to provide a first sum.

8. The method of claim 7 wherein said calculation step further includes summing the inverse of the spreading factors for all of said plurality (i) of physical channels to provide a second sum.

9. The method of claim 8 wherein said calculation step further includes dividing said first sum by said second sum.

10. A communications unit for communicating on a plurality of physical channels, each physical channel having a first transmission power level, said unit comprising:
    a signal processor for transmitting a plurality of signals on said plurality of physical channels; and a circuit for controlling the power of each of said physical channels; whereby said circuit equalizes the signal to interference ratios (SIRs) of said plurality of physical channels by:
    determining the SIR for each of said plurality of physical channels;
    determining a first average SIR based upon said SIR for said plurality of physical channels; and
    calculating a new transmission power level for each of said plurality of physical channels; whereby said calculation of said new transmission power levels comprises:
        ensuring the new SIRs of said plurality of physical channels are equal to each other; and
        ensuring the new average SIR for said plurality of physical channels is substantially the same as said first average SIR.

* * * * *

UNITED STATES PATENT AND TRADEMARK OFFICE
CERTIFICATE OF CORRECTION

PATENT NO. : 7,158,807 B2  
APPLICATION NO. : 10/629420  
DATED : January 2, 2007  
INVENTOR(S) : Paul Marinier Page 1 of 1

It is certified that error appears in the above-identified patent and that said Letters Patent is hereby corrected as shown below:

IN THE DRAWINGS

At FIG. 5, item 43, lines 3 & 4, after the word "WEIGHTED", in both cases, delete "SIR's" and insert therefor --SIRs--.

IN THE SPECIFICATION

At column 5, line 4, after the word "these", delete "set" and insert therefor --sets--.

At column 5, line 7, after the word "value", delete "($P_1'$, $P_2'$,...,$P_N'$)" and insert therefor --($P_1'$, $P_2'$,...,$P_N'$)--.

At column 6, line 10, after "mW and", delete "$I^2=8x$" and insert therefor --$I_2=8x$--.

At column 6, line 11, after the words "loss is", delete "$L=1x10^9$" and insert therefor --$L=1x10^{-9}$--.

At column 6, line 19, before "$=\overline{SIR}_{log}$", delete "$\overline{SIR}$ hd lin" and insert therefor --$\overline{SIR}_{lin}$--.

At column 8, line 38, after the word "defined", insert --in--.

At column 9, line 6, before the word "slot", delete "very" and insert therefor --every--.

Signed and Sealed this

Twelfth Day of August, 2008

JON W. DUDAS  
*Director of the United States Patent and Trademark Office*